Sept. 21, 1926.
F. W. HARRIS
WELDING TORCH AND TIP THEREFOR
Filed Dec. 21, 1925
1,600,732
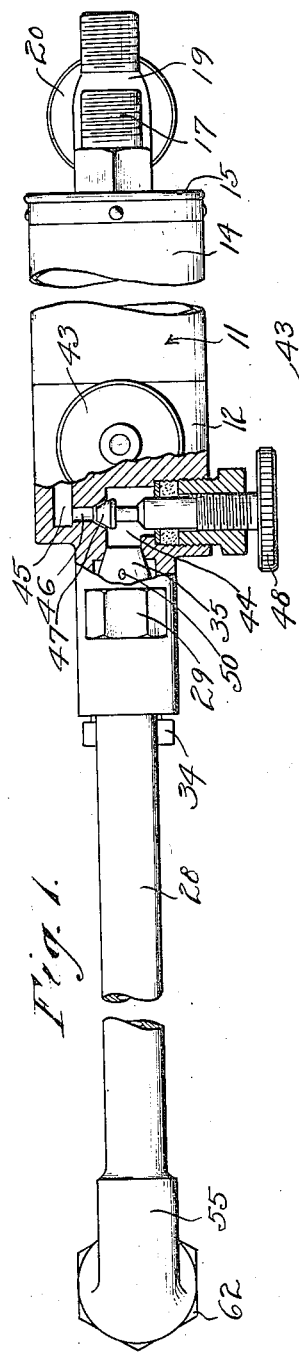
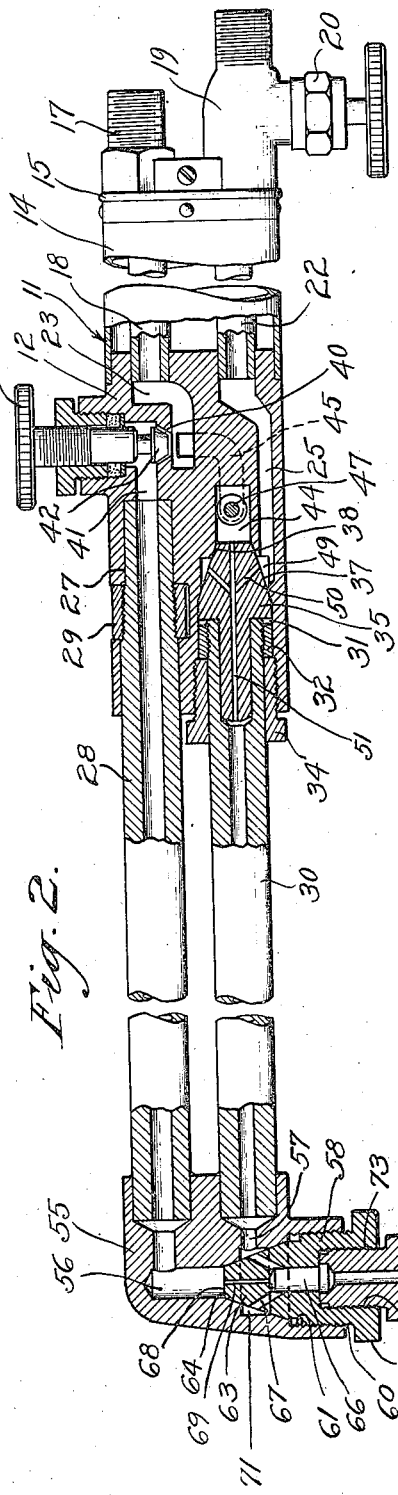
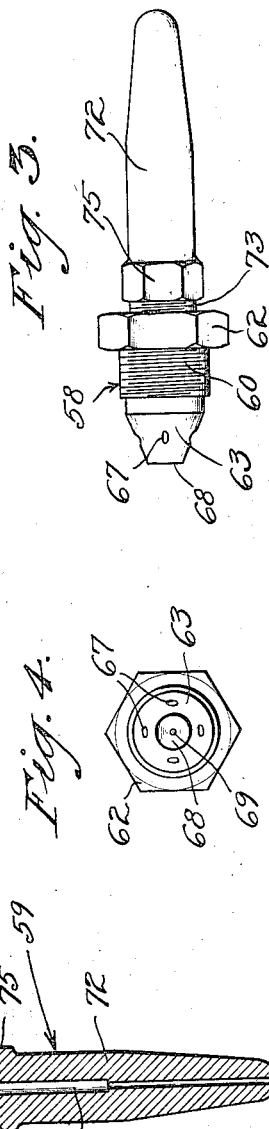
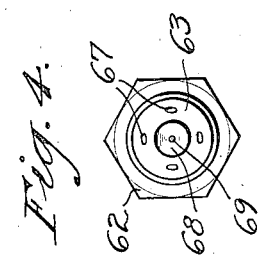
INVENTOR:
Fred W Harris Patented Sept. 21, 1926.

1,600,732

UNITED STATES PATENT OFFICE.

FORD W. HARRIS, OF LOS ANGELES, CALIFORNIA, ASSIGNOR TO PUROX COMPANY, OF DENVER, COLORADO, A CORPORATION OF COLORADO.

WELDING TORCH AND TIP THEREFOR.

Application filed December 21, 1925. Serial No. 76,633.

My invention relates to autogeneous welding and consists of a novel and improved form of welding torch and welding tip.

In the ordinary oxyacetylene torch the oxygen gas is mixed at a place inside the handle and is conducted through a tube to the tip head of the torch to which a welding tip is attached. When welding wrought iron or steel it is desirable to have a "balanced" flame having neither an excess of oxygen gas nor an excess of acetylene gas, allowing, of course, for the addition of oxygen contained in the air. When welding cast iron and other materials it is found that a better weld can be made if a combustion supporting gas, as oxygen, is added to the mixture. The ordinary oxyacetylene torch is not constructed so that it will successfully produce a flame having an excess of oxygen gas, since the mixture in such a case is so highly combustible that the flame will burn back into the torch, causing a flashback. Frequent flashbacks burn the side of the torch and ruin it. There is also danger of a flashback passing entirely through the torch and into the hose which connects the gas supply, and in certain instances the flashbacks have reached the gas supply, resulting in disastrous explosions.

For the above reasons and because of the bother of relighting the torch after flashbacks, a flame with a material excess of oxygen is not used even when welding cast iron despite the fact that a better weld is made when oxygen is added to the mixture.

I have discovered that a flame supported with an excess of oxygen may be obtained without the liability of flashbacks if the excess oxygen employed is added to the usual mixture of oxygen and acetylene gas, at the welding tip.

It is therefore an object of this invention to provide a welding torch which supplies a substantially balanced mixture of oxygen or other combustion supporting gas and acetylene or other combustible gas to the tip and also supplies additional combustion supporting gas to the combustible mixture just before it passes from the tip of the torch.

I find that a good oxidizing flame is produced if the excess oxygen is added to the combustible mixture as it enters the tip of the torch. This tip, also being a part of the present invention, must be designed so that the combustible mixture and the added combustion supporting gas may be suitably combined where the combustible mixture enters the tip.

It is another object of this invention to provide a welding tip which will combine a combustible mixture and an added combustion supporting gas.

In the manufacture of my tip it is desirable to make it in two parts which I denominate an adapter and a nozzle, the parts being removably attached together. This renders the tip economical to produce and also, since the nozzle is substantially like an ordinary welding tip, permits them to be used in conjunction with the adapter of my invention.

It is accordingly another object of this invention to provide a tip of the character mentioned which is made in two parts so that a portion thereof may be used in conjunction with an ordinary welding tip.

I find that it is beneficial to have the excess oxygen or combustion supporting gas supplied to the combustible mixture at a comparatively high pressure, and it is another object of my invention to provide a torch in which the added combustion supporting gas is supplied to the combustible mixture at a high pressure.

Other objects and advantages of the invention will be made evident hereinafter.

Referring to the drawing in which I illustrate my invention,

Fig. 1 is a view, partially sectioned, of a torch embodying the features of my invention.

Fig. 2 is a view taken at right angles to Fig. 1 and partially sectioned to show the features of my invention.

Fig. 3 is an elevational view of the tip of my invention.

Fig. 4 is an end view of the tip of this invention.

The form of my invention shown in the drawing has a handle or grip 11 which is comprised of a head or body 12, a sleeve 14 which is secured to the rear part of the body 12 and a tail member 15 which is secured to the rear end of the sleeve 14. The member 15 carries a fixture 17 to which an oxygen conduit 18 is connected, the fixture 17 providing means whereby an oxygen hose may be connected to the torch. The member 15 also carries a fixture 19 which provides an acetylene valve 20. An acetylene conduit 22 connects to the fixture 19 and acetylene gas will flow therethrough when the acetylene valve 20 is opened. The oxygen and acetylene conduits 18 and 22 extend inside the sleeve 14, as is shown best in Fig. 2.

The forward end of the oxygen conduit 18 connects to the body 12 in communication with an oxygen passage 23 and the forward end of the acetylene conduit 22 connects to the body 12 in communication with an acetylene passage 25. Extending into the cavity 27 formed in the forward end of the body 12 is the rear end of an oxygen or combustion supporting gas tube 28 which is secured in the cavity 27 by means of a nut 29. The rear end of a mixed gas tube 30 extends into a cavity 31 and has a collar 32 secured on the inner end thereof, which collar is engaged by a nut 34 and the mixed gas tube 30 is thus locked in place. A mixer 35 is retained in the cavity 31 by engagement of the end of the mixed gas tube 30 therewith, a conical face 37 of the mixer 35 being held in tight engagement with a conical seat 38 provided by a wall of the cavity. The oxygen passage 23 connects through an opening 40 with a passage 41 which communicates with the opening through the oxygen or combustion supporting gas tube 28. The opening 40 is closed by a valve 42 which has an exterior knob 43 by means of which it is operated. The oxygen passage 23 has a branch oxygen passage 45 which connects to an oxygen chamber 44 formed at the rear part of the cavity 31, this branch passage 45 connecting to the chamber 44 through an opening 46 which may be closed by an oxygen valve 47, this oxygen valve 47 having an exterior knob 48 by means of which it is operated. The acetylene passage 25 connects to an annular space 49 with which acetylene passages 50 of the mixer 35 connect. The inner ends of these passages 50 connect with a passage 51 which extends entirely through the mixer, connecting to the chamber 44 and an opening of the mixed gas tube 30.

The forward ends of the tubes 28 and 30 are connected to a tip head 55. The tip head 55 is provided with an oxygen or combustion supporting gas passage 56 which is in communication with the opening through the oxygen or combustion supporting gas tube 28 and is also provided with a mixed gas opening 57 which is in communication with the opening of the mixed gas tube 30.

Secured to the tip head 55 is an adapter 58 of a tip 59 of my invention. This adapter 58 is provided with a cylindrical threaded portion 60 which is screwed into a threaded cavity 61 of the tip head 55, being screwed thereinto by the application of a wrench to a hexagonal portion 62 formed at the lower end of the adapter 58. Extending upward from the threaded cylindrical portion 60 of the adapter 58 is a conical plug 63 which tightly engages a conical seat 64 provided by the tip head 55. The adapter 58 is provided with a chamber or central hole 66 which is connected to the conical face of the plug 63 by means of openings 67 and is connected to an end face 68 of the plug 63 by a small orifice 69. The opening 67 connects with an annular channel 71 formed in the tip head 55 to which channel 71 the mixed gas opening 57 is connected. The orifice 69 connects to the lower end of the enriching gas passage 56.

The tip 59 of my invention also includes a nozzle 72. The nozzle 72 has an upper threaded projection 73 which is screwed into a threaded cavity 74 formed in the lower part of the adapter 58 just below the hole 66 thereof. Below the threaded projection 73 is formed a polygonal portion 75 for the use of a wrench in screwing or unscrewing the nozzle 72. A hole 78 is formed entirely through the nozzle 72, the upper end thereof being in communication with the hole 66 of the adapter 58. The nozzle 72 of the invention is practically identical in design with the ordinary welding tip on the market today.

The operation of the invention is as follows:

In lighting the torch the acetylene valve 20 is first turned on and a flow of acetylene gas is established through the fixture 19, the acetylene conduit 22, the acetylene passage 25, the mixer 35, the mixed gas tube 30, the tip head 55, the adapter 58 and through the nozzle 72. The acetylene gas is lighted directly after which the oxygen valve 47 is opened and a flow of oxygen gas is established through the fixture 17, the oxygen conduit 18, the oxygen passage 23, the branch passage 45, the chamber 44 and into the mixer 35 whereat it is mixed with the acetylene gas and flows therewith through the mixed gas tube 30, the head 55 and the tip 59. A balanced flame may be provided by a proper manipulation of the acetylene valve 20 and the oxygen valve 47. This much of the invention is substantially the same as an ordinary welding torch and such a flame is very good for welding wrought iron and steel.

As previously mentioned, such a flame is not the best flame for welding cast iron, since it is desirable to have an excess of oxygen in the flame. In my invention this excess of oxygen is supplied by opening the valve 42. This connects the oxygen opening 41 with the oxygen passage 23 and permits gas to flow therethrough and through the oxygen or combustion supporting gas tube 28 and into the oxygen or combustion supporting gas passage 56 of the tip head 55. Since the orifice 69 is quite small, the pressure is maintained quite high and the oxygen or combustion supporting gas will flow through this orifice 69 at a comparatively high pressure. This gas mixes with the combustible mixture in the hole 66 of the adapter 58 and flows therewith through the tip 59. The flame provided when the oxygen gas valve 42 is opened manifests a considerable excess of oxygen and is very desirable for welding cast iron.

My invention is very important to the art because it makes it possible to provide a flame in which there is an excess of oxygen or other combustion supporting gas without danger of flashbacks. My invention accomplishes this important feature by reason of the oxygen or other combustion supporting gas being introduced at the tip of the torch or at a point directly before it passes from the tip of the flame.

The torch provided by my invention is novel in design and may be used when welding wrought iron and such and when welding cast iron. When wrought iron or the like is being welded it is not necessary to have a flame in which there is an excess of oxygen and the gas valve 42 may be closed, whereas if a flame having an excess of oxygen or other combustion supporting gas is desired the valve 42 may at this time be opened.

The tip 59 also embodies an important part of my invention. The tip is made in two parts, namely, an adapter and a nozzle so that it may be easy and economical to manufacture and so that the adapter 58 thereof may be used in conjunction with a standard welding tip, the nozzle being of substantially identical construction therewith.

In the foregoing description I have described my invention as an oxyacetelyene torch. It should be understood, however, that my invention may use other gases for providing the flame so long as a combustible gas and combustion supporting gas is used. Therefore, I do not wish to limit my invention to an oxyacetylene torch.

I claim as my invention:

1. In a welding torch, the combination of: a tip head having a combustion supporting gas passage, and a combustible mixture passage; an adapter secured to said head having a hole extending inward from the lower end thereof, an orifice communicating said hole with said combustion supporting gas passage, and an opening communicating said hole with said combustible mixture passage; and a nozzle secured to said adapter and having a hole formed therethrough which communicates with said hole of said adapter.

2. In a welding torch, the combination of: a tip head having a combustion supporting gas passage, and a combustible mixture passage; an adapter secured to said head having a conical plug which seats in a conical seat of said tip head and having a hole extending inward from the lower end thereof, an orifice communicating said hole with said combustion supporting gas passage, and an opening communicating said hole with said combustible gas passage; and a nozzle secured to said adapter and having a hole formed therethrough which communicates with said hole of said adapter.

3. In a welding torch, the combination of: a tip head having a combustion supporting gas passage, and a combustible mixture passage; an adapter secured to said head having a hole extending inward from the lower end thereof, an orifice communicating said hole with said combustion supporting gas passage, and an opening communicating said hole with said combustible gas passage; and a nozzle having a threaded projection adapted to be screwed into a threaded cavity of said adapter, said nozzle being thereby secured to said adapter and having a hole formed therethrough which communicates with said hole of said adapter.

4. In a welding torch, the combination of: a tip head having a combustion supporting gas passage, and a combustible mixture passage; an adapter secured to said head having a conical plug which seats in a conical seat of said tip head and having a hole extending inward from the lower end thereof, an orifice communicating said hole with said combustion supporting gas passage, and an opening communicating said hole with said combustible gas passage; and a nozzle having a threaded projection adapted to be screwed into a threaded cavity of said adapter, said nozzle being thereby secured to said adapter and having a hole formed therethrough which communicates with said hole of said adapter.

5. In a welding tip, the combination of: an adapter comprising a cylindrical threaded portion, a conical plug extending from said cylindrical threaded portion, a threaded cavity formed in said cylindrical threaded portion, a hole formed in said conical plug communicating with said threaded cavity, an orifice extending from said hole to the end of said conical plug opposite the said threaded cavity, and an opening extending from said hole to the side of said conical plug; and a nozzle having a threaded projection adapted to be screwed into said threaded cavity, and a hole formed therethrough and communicating with said hole of said adapter.

In testimony whereof, I have hereunto set my hand at Los Angeles, California, this 14th day of December, 1925.

FORD W. HARRIS.